United States Patent
Savolainen et al.

(10) Patent No.: US 11,529,666 B2
(45) Date of Patent: Dec. 20, 2022

(54) METHOD FOR EXPANDING AN END OF A PIPE AND EXPANDER TOOL

(71) Applicant: Uponor Innovation AB, Virsbo (SE)

(72) Inventors: Mika Savolainen, Lahti (FI); Jyri Laakso, Valkeakoski (FI); Mika Uosukainen, Lahti (FI); Vesa Rotso, Kukkila (FI)

(73) Assignee: UPONOR INNOVATION AB, Virsbo (SE)

( * ) Notice: Subject to any disclaimer, the term of this patent is extended or adjusted under 35 U.S.C. 154(b) by 169 days.

(21) Appl. No.: 16/619,315

(22) PCT Filed: May 31, 2018

(86) PCT No.: PCT/EP2018/064356
§ 371 (c)(1),
(2) Date: Dec. 4, 2019

(87) PCT Pub. No.: WO2018/224389
PCT Pub. Date: Dec. 13, 2018

(65) Prior Publication Data
US 2020/0094306 A1     Mar. 26, 2020

(30) Foreign Application Priority Data
Jun. 5, 2017 (FI) .................................. 20175510

(51) Int. Cl.
*B21D 39/20* (2006.01)
*B21D 41/02* (2006.01)
(Continued)

(52) U.S. Cl.
CPC .......... *B21D 39/20* (2013.01); *B21D 41/028* (2013.01); *B29C 35/02* (2013.01); *B29C 48/918* (2019.02);
(Continued)

(58) Field of Classification Search
CPC ... B21D 39/20; B21D 39/203; B21D 39/2065
See application file for complete search history.

(56) References Cited

U.S. PATENT DOCUMENTS 9,555,577 B2    1/2017  Greding
2004/0107754 A1  6/2004  Frenken
(Continued)

FOREIGN PATENT DOCUMENTS

EP    1792704 B1    1/2009
EP    2420333 B1    11/2014
(Continued)

OTHER PUBLICATIONS

Finnish Patent and Registration Office Search Report for FI Patent Application No. 20175510, dated Jan. 2, 2018.
(Continued)

*Primary Examiner* — Timothy Kennedy
*Assistant Examiner* — Alexander A Wang
(74) *Attorney, Agent, or Firm* — Brooks Kushman P.C.

(57) ABSTRACT

A method for expanding an end of a pipe made of plastics having shape memory with the aid of an expander tool having a tool head having an expansion member arranged to be insertable inside the end of the pipe. The method includes steps of measuring the temperature of the pipe to be expanded, adjusting at least one of the expansion control parameters of the tool head on the basis the measured temperature of the pipe, and expanding the end of the pipe utilizing the adjusted expansion control parameter of the tool head. The expander tool includes a temperature sensor for measuring temperature of the pipe to be expanded and/or ambient temperature, and an electronic control unit for adjusting at least one of the expansion control parameters of the tool head on the basis the measured temperature value.

18 Claims, 4 Drawing Sheets

(51) Int. Cl.
*B29C 57/04* (2006.01)
*B29C 57/08* (2006.01)
*B29C 48/88* (2019.01)
*B29C 57/00* (2006.01)
*B29C 35/02* (2006.01)

(52) U.S. Cl.
CPC .............. *B29C 57/00* (2013.01); *B29C 57/04* (2013.01); *B29C 57/08* (2013.01)

(56) References Cited

U.S. PATENT DOCUMENTS

| | | | |
|---|---|---|---|
| 2010/0264564 A1* | 10/2010 | Tabanelli | B29C 57/02 264/323 |
| 2015/0114068 A1* | 4/2015 | Hasenberg | B21D 41/021 72/312 |
| 2015/0258598 A1 | 9/2015 | Frenken | |

FOREIGN PATENT DOCUMENTS

| | | |
|---|---|---|
| EP | 2910360 A1 | 8/2015 |
| GB | 639103 A | 6/1950 |

OTHER PUBLICATIONS

International Search Report PCT/EP2018/064356 dated Aug. 13, 2018.

* cited by examiner

METHOD FOR EXPANDING AN END OF A PIPE AND EXPANDER TOOL

CROSS-REFERENCE TO RELATED APPLICATION

This application is the U.S. national phase of PCT Application No. PCT/EP2018/064356 filed on May 31, 2018, which claims priority to FI Patent Application No. 20175510 filed on Jun. 5, 2017, the disclosures of which are incorporated in their entirety by reference herein.

FIELD OF THE INVENTION

The present invention relates to a method for expanding an end of a pipe made of plastics having shape memory with the aid of an expander tool having a tool head comprising expansion means arranged to be insertable inside the end of the pipe. Further, the present invention relates to an expander tool.

BACKGROUND OF THE INVENTION

It is a known fact that pipes made of plastics having shape memory, such as pipes made of PE (polyethylene), PEX (cross-linked polyethylene), PE-RT (Polethylene of Raised Temperature resistance), UHMWPE (Ultra-high-molecular-weight polyethylene) after being expanded have a shrinking speed which depends on the temperature of the pipe. In cold ambient temperature the temperature of the pipe is low and the shrinking speed is low whereby more force is needed to expand the pipe because the pipe is stiffer than in warm weather. When the ambient temperature is warm, the pipe is warm and less force is needed because the pipe is more elastic. In general, shape-memory polymers are polymeric smart materials that have the ability to return from a deformed state (temporary shape) to their original (permanent) shape. Despite of the ambient temperature, in usual installation conditions, the shape memory will return the part to the original shape. Heat or any other stimulus is not needed to cause the returning to the shape.

In practice, the installer has needed to manually control the number of expansion cycles depending on the temperature of the environment. The problem is that the quality of the pipe joint (tightness) much depends on the skills of the installer. The installer may easily apply less or more expansion cycles than optimum in particular temperature conditions.

U.S. Pat. No. 9,555,577 discloses a device and procedure for expanding the end of a plastic pipe. The document discloses adjusting radial distance between spreading surfaces based on ambient temperature.

OBJECTIVE OF THE INVENTION

The objective of the invention is to alleviate the disadvantages mentioned above.

In particular, it is an objective of the present invention to provide a method and expander tool which reduces the effect of varying skills of the installer on the quality of the pipe joint and thus improves the pipe joint quality. Further, the invention enables automatic adjustment of expansion control parameters in accordance with the temperature of the pipe to be expanded.

SUMMARY OF THE INVENTION

According to a first aspect, the present invention provides a method for expanding an end of a pipe made of plastics having shape memory with the aid of an expander tool having a tool head comprising expansion means arranged to be insertable inside the end of the pipe. The method comprises steps of measuring temperature; adjusting at least one of the expansion control parameters of the tool head on the basis the measured temperature; and expanding the end of the pipe utilizing the adjusted expansion control parameter of the tool head. According to the invention in the measuring step the temperature of the pipe to be expanded is measured directly by contacting the pipe, and in the adjusting step at least one of the expansion control parameters of the tool head is adjusted on the basis of the directly measured temperature of the pipe.

The technical effect of the invention is that temperature of the pipe to be expanded can optimally be taken into account in the expanding process as the shrinking speed of the expanded pipe depends on the temperature.

In an embodiment of the method, the expansion control parameter to be adjusted is the number of expansion cycles, and/or the expansion time, and/or the dimension of the expansion diameter.

In an embodiment of the method, the temperature of the pipe to be expanded is measured by a temperature sensor integrated in the tool head.

In an embodiment of the method, the method comprises a step of recognizing the diameter of the pipe to be expanded and by adjusting the at least one of the expansion control parameters on the basis of the measured diameter of the pipe.

In an embodiment of the method, the method comprises a step of heating the pipe by a heater included in the tool head.

In an embodiment of the method, the method comprises a step of cooling the pipe by a cooler included in the tool head.

In an embodiment of the method, the method comprises a step of manually adjusting the at least one of the expansion control parameters with an input device included in the expander tool.

In an embodiment of the method, the method comprises a step of automatically adjusting the at least one of the expansion control parameters with an electronic control unit included in the expander tool.

According to a second aspect, the present invention provides an expander tool for expanding an end of a pipe made of plastics having shape memory, the expander tool comprising a tool head which comprises expanding means arranged to be insertable inside the end of the pipe for expanding the end of the pipe. The expander tool comprises a temperature sensor, and an electronic control unit for adjusting at least one of the expansion control parameters of the tool head on the basis the measured temperature value. According to the invention the temperature sensor is arranged to measure the temperature of the pipe to be expanded directly by making contact to the pipe.

In an embodiment of the expander tool, the electronic control unit is configured to adjust the expansion control parameter which is the number of expansion cycles and/or the expansion time and/or the dimension of the expansion diameter.

In an embodiment of the expander tool, the expander tool comprises a set of interchangeable and detachably attachable tool heads for different pipe diameters, and that each tool head comprises a temperature sensor.

In an embodiment of the expander tool, the electronic control unit is arranged in the tool head.

In an embodiment of the expander tool, the expander tool comprises an expander tool frame and the tool head comprises a head frame which is detachably attachable to the expander tool frame In an embodiment of the expander tool, the temperature sensor is arranged in the tool head.

In an embodiment of the expander tool, the electronic control unit is arranged inside the expander tool frame In an embodiment of the expander tool, the tool head which is configured for expansion of a predetermined pipe diameter comprises an electronic identification means to identify said predetermined pipe dimension, and that the electronic control unit located in the expander tool is arranged to recognize the electronic identification means and adjust the at least one of the expansion parameters on the basis of the identified pipe dimension.

In an embodiment of the expander tool, the expander tool comprises a heater and/or a cooler for heating and/or cooling the pipe to be expanded.

In an embodiment of the expander tool, the heater and/or the cooler is arranged in the tool head.

In an embodiment of the expander tool, the expander tool comprises an input device for manually adjusting the at least one of the expansion control parameters.

In an embodiment of the expander tool, the tool head comprises a plurality of spreading elements forming said expanding means, the spreading elements being radially movable in relation to a center longitudinal axis of the tool head between a starting position, at which the spreading elements are close along said axis and are insertable into the end of the pipe, to an outwardly extended expansion position radially distanced from said axis so as to expand the end of the pipe, each of the spreading elements having an outer spreading surface configured to press against an interior surface of the end of the pipe.

In an embodiment of the expander tool, the expander tool comprises a piston configured to spread the spreading elements from the starting position to the expansion position by moving along said axis from a retracted piston position to a fully extended piston position against interior surfaces of the spreading elements, and an actuator for moving the piston.

In an embodiment of the expander tool, the temperature sensor is arranged to the spreading element to measure the temperature by making contact to the pipe.

In an embodiment of the expander tool, the tool head comprises
 a gripping member insertable into the pipe at a distance from the end of the pipe, the gripping member being transformable between a release position allowing its insertion into the pipe and a pressing position wherein the gripping member exerts a pressing force to the inner surface of pipe to hold the pipe firmly in relation to the tool head,
 a pull rod which is axially movable for transforming the gripping member between the release position and the pressing position, and
 a mandrel sleeve having a conical outer surface forming said expansion means, the mandrel sleeve being axially movable between a retracted position wherein the mandrel sleeve is at position out from the position of the end of the pipe, and an expansion position wherein the mandrel sleeve is pushed into the end of the pipe for expanding the end of the pipe.

In an embodiment of the expander tool, the tool head comprises a holding sleeve having an inner channel to receive the pipe for holding the pipe stationary against the pushing force of the mandrel sleeve during expansion of the end of the pipe from outside of the pipe.

In an embodiment of the expander tool, the holding sleeve comprising mutually openable and closable holding sleeve parts to enable closing of the holding sleeve to a closed position around the tube for the expanding operation of the end of the tube, and for opening of the holding sleeve to an opened position for releasing the expanded end of the pipe.

In an embodiment of the expander tool, the holding sleeve comprises a first holding sleeve part and a second holding sleeve part, and a lock device for locking the calibration sleeve parts in a closed position.

In an embodiment of the expander tool, the first holding sleeve part comprises a first pivot arm which is pivoted to be turnable about a pivot hinge axle, and the second holding sleeve part comprises a second pivot arm which is pivoted to be turnable about the same pivot hinge axle as the first pivot arm.

In an embodiment of the expander tool, the temperature sensor is arranged to the gripping member and/or to the mandrel sleeve and/or to the holding sleeve.

It is to be understood that the aspects and embodiments of the invention described above may be used in any combination with each other. Several of the aspects and embodiments may be combined together to form a further embodiment of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

FIGS. 1-4 show an expander tool 1 for expanding an end of a pipe made of plastics having shape memory. The expander tool 1 is designed and especially suitable to expand the end of the pipes used in plumbing applications. Such pipes include pipes having shape memory capacity, such as pipes made of PE (polyethylene), PEX (cross-linked polyethylene), PE-RT (Polyethylene of Raised Temperature resistance), UHMWPE (Ultra-high-molecular-weight polyethylene) which, after being expanded, have a shrinking speed which depends on the temperature of the pipe. The expander tool 1 can also be used to expand SACP (Seamless aluminium composite pipe) although it does not have the shape memory capacity. SACP pipe is built up from two concentric plastic layers with an intermediate seamless layer of aluminum and all these three layers are attached to each other by adhesive layers. The tool device is also suitable for expanding the ends of metal pipes, such as copper pipes. The expander tool 1 is preferably a handheld power tool having a handle H by which the operator can hold the expander tool by hand to perform the expansion operation.

Further referring to FIGS. 1 to 4, the expander tool comprises a tool head 2 which comprises expanding means 3 arranged to be insertable inside the end of the pipe for expanding the end of the pipe. The expanding means 3 is formed of six spreading elements 13. The spreading elements 13 are radially movable in relation to a center longitudinal axis x of the tool head 2 between a starting position I (FIGS. 1 and 2) at which the spreading elements 13 are close along said axis x and are insertable into the end of the pipe, to an outwardly extended expansion position II (FIGS. 3 and 4) radially distanced from said axis x so as to expand the end of the pipe. Each of the spreading elements 13 have an outer spreading surface 14 configured to press against an interior surface of the end of the pipe. The expander tool 1 further comprises a piston 15 configured to spread the spreading elements 13 from the starting position I to the expansion position II by moving along said axis x from a retracted piston position III to a fully extended piston position IV against interior surfaces of the spreading elements 13, and an actuator 16 for moving the piston 15. The actuator 16 can be for example a hydraulic cylinder whereby the handle may contain equipment such as a rechargeable battery, a hydraulic pump to produce hydraulic pressure for the hydraulic cylinder, an electric motor for driving the hydraulic pump and an on-off switch, which can be operated by the operator to control the operation of the tool.

The expander tool 1 comprises an expander tool frame 10 and the tool head 2 comprises a head frame 11 which is detachably attachable to the expander tool frame 10.

The expander tool 1 preferably comprises a set of interchangeable and detachably attachable tool heads 2 for different pipe diameters. The expander tool 1 comprises a temperature sensor 5 for measuring temperature of the pipe to be expanded and/or ambient temperature. The temperature sensor 5 may be arranged in the tool head 2. When the expander tool 1 comprises a set of interchangeable and detachably attachable tool heads 2 for different pipe diameters, then each tool head 2 comprises a temperature sensor 5.

Figure 1:
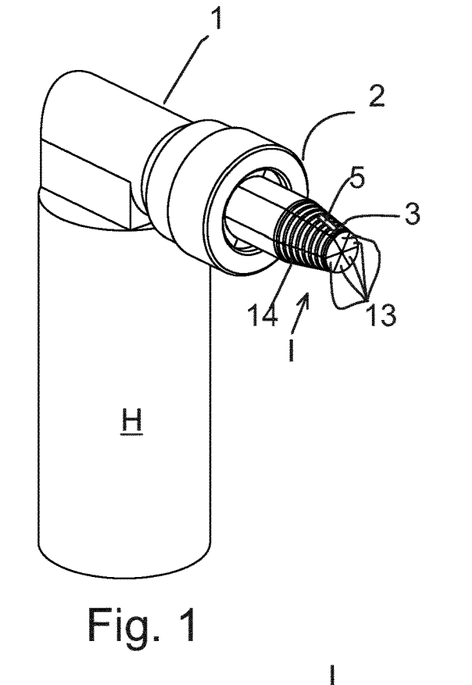
FIG. 1 is an axonometric view of a first embodiment of the expander tool according to the invention, the tool head being at a starting position.
Figure 2:
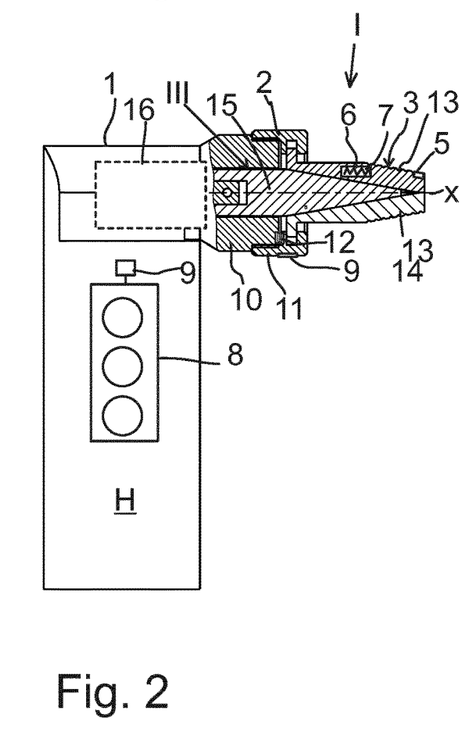
FIG. 2 is a partial cross-section of the expander tool of FIG. 1.
Figure 3:
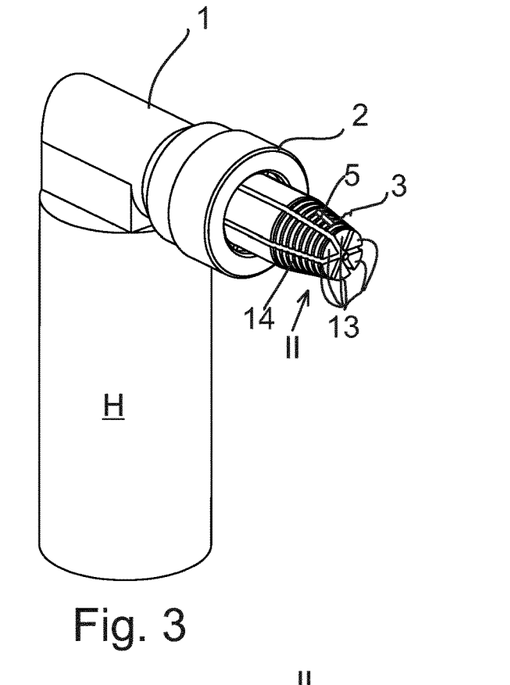
FIG. 3 shows the expander tool of FIG. 1 in an expansion position.
Figure 4:
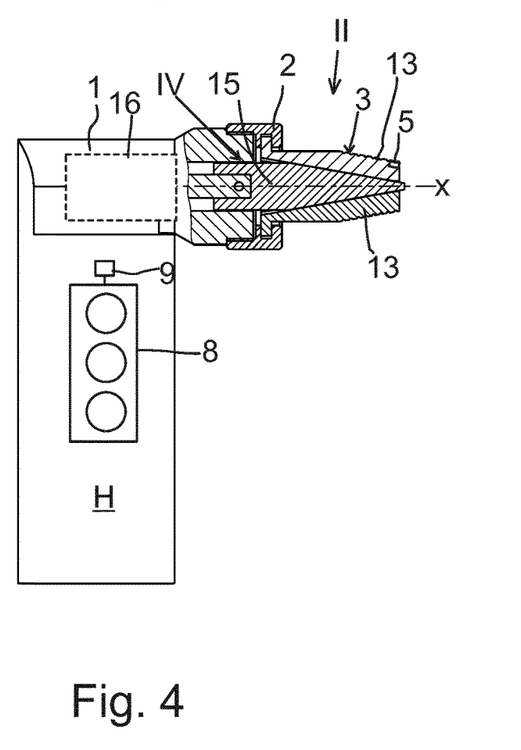
FIG. 4 is a partial cross-section of the expander tool of FIG. 3.

In the embodiment shown in FIGS. 1 to 4 the temperature sensor 5 is arranged to one or more spreading elements 13 to measure the temperature by making contact to the pipe. The temperature sensor 5 may also be arranged to measure the temperature of the pipe to be expanded indirectly by measuring ambient temperature of the room wherein the pipe has been stored. Referring to FIGS. 2 and 4, an electronic control unit 9 is arranged for adjusting at least one of the expansion control parameters of the tool head on the basis the measured temperature value. The expansion control parameter to be adjusted may be number of expansion cycles, and/or expansion time, and/or dimension of the expansion diameter. The electronic control unit 9 may be arranged inside an expander tool frame 10, as in FIGS. 2 and 4, or the electronic control unit 9 may be arranged in the tool head 2. The electronic control unit 9 is configured to adjust the expansion control parameter which is the number of expansion cycles and/or the expansion time and/or the dimension of the expansion diameter.

The tool head 2 which is configured for expansion of a predetermined pipe diameter comprises an electronic identification means 12 (see FIG. 2) to identify the predetermined pipe dimension. The electronic control unit 9 located in the expander tool 1 is arranged to recognize the electronic identification means 12 and adjust the at least one of the expansion parameters on the basis of the identified pipe dimension.

As schematically illustrated in FIG. 2, the expander tool 1 may also comprise a heater 6 and/or a cooler 7 for heating and/or cooling the pipe to be expanded. The heater 6 and/or the cooler 7 may be arranged in the tool head 2. The expander tool 1 may further comprise an input device 8 for manually adjusting the at least one of the expansion control parameters.

Figure 8:
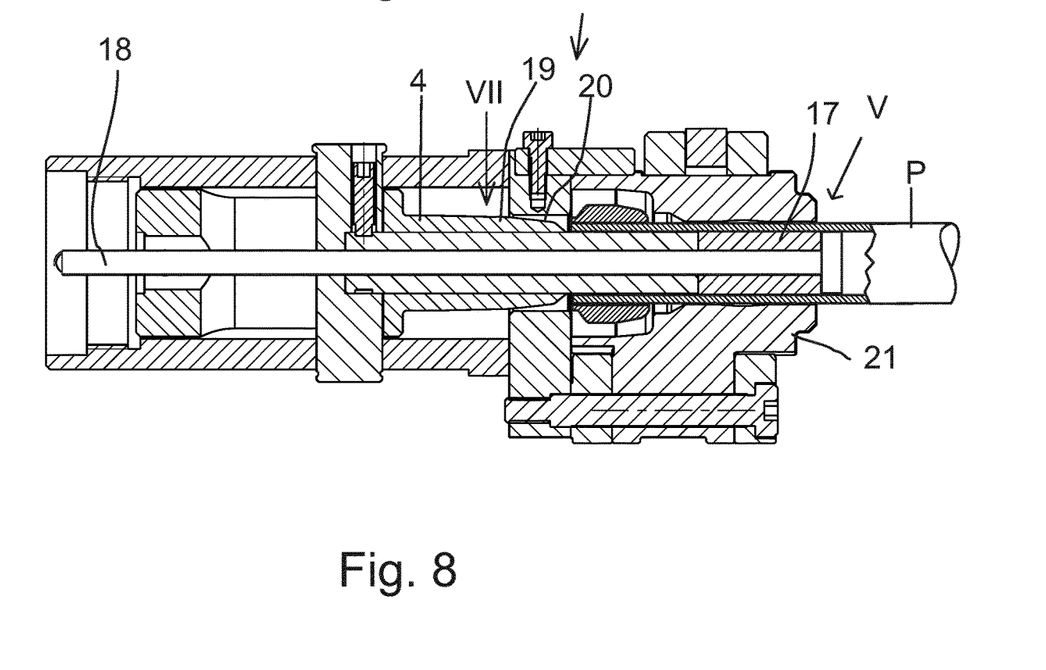
FIG. 8 is the expander tool of FIG. 7 with a pipe with a compression ring being inserted.
Figure 9:
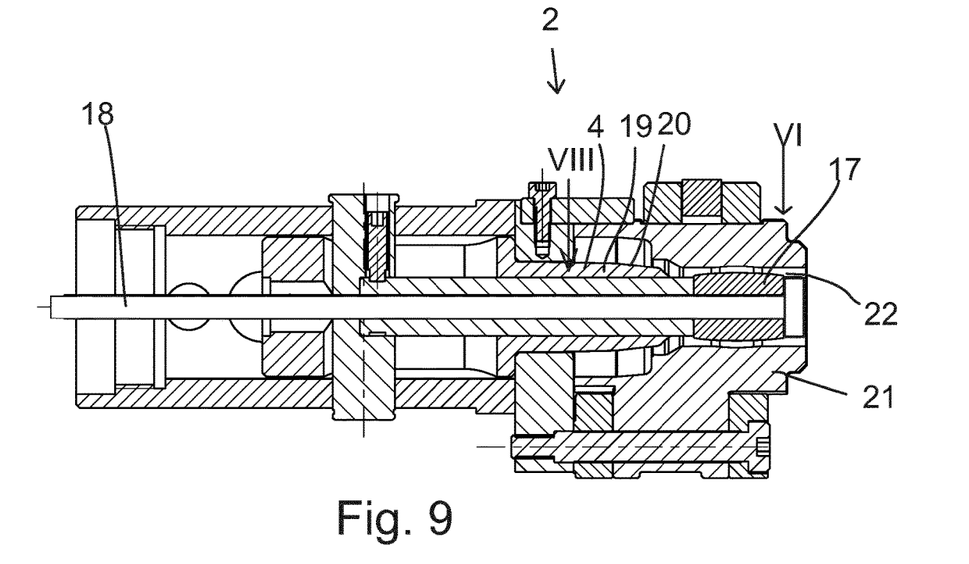
FIG. 9 shows the expander tool of FIG. 7 without a pipe the gripping member being in pressing position and the mandrel sleeve being moved to the expansion position.

FIGS. 5 to 10 show another embodiment of the tool head 2. The tool head 2 comprises a gripping member 17 which can be inserted into the pipe at a distance from the end of the pipe as shown in FIG. 8. The gripping member 17 is transformable between a release position V shown in FIGS. 5, 7 and 8 and a pressing position VI shown in FIGS. 9 and 10. The release position V allows insertion of the gripping member 17 into the pipe. In the pressing position VI the gripping member exerts a pressing force to the inner surface of pipe to hold the pipe firmly in relation to the tool head 2. The tool head 2 further comprises a pull rod 18 which is axially movable for transforming the gripping member 17 between the release position V and the pressing position VI. Further, the tool head 2 comprises a mandrel sleeve 19. The mandrel sleeve 19 has a conical outer surface 20 forming the expansion means 4. The mandrel sleeve 19 is axially movable between a retracted position VII shown in FIGS. 5, 7 and 8 and an expansion position VIII shown in FIGS. 9 and 10. In the retracted position VIII the mandrel sleeve 19 is at a position out from the position of the end of the pipe. In the expansion position VIII the mandrel sleeve 19 is pushed into the end of the pipe for expanding the end of the pipe.

Figure 5:
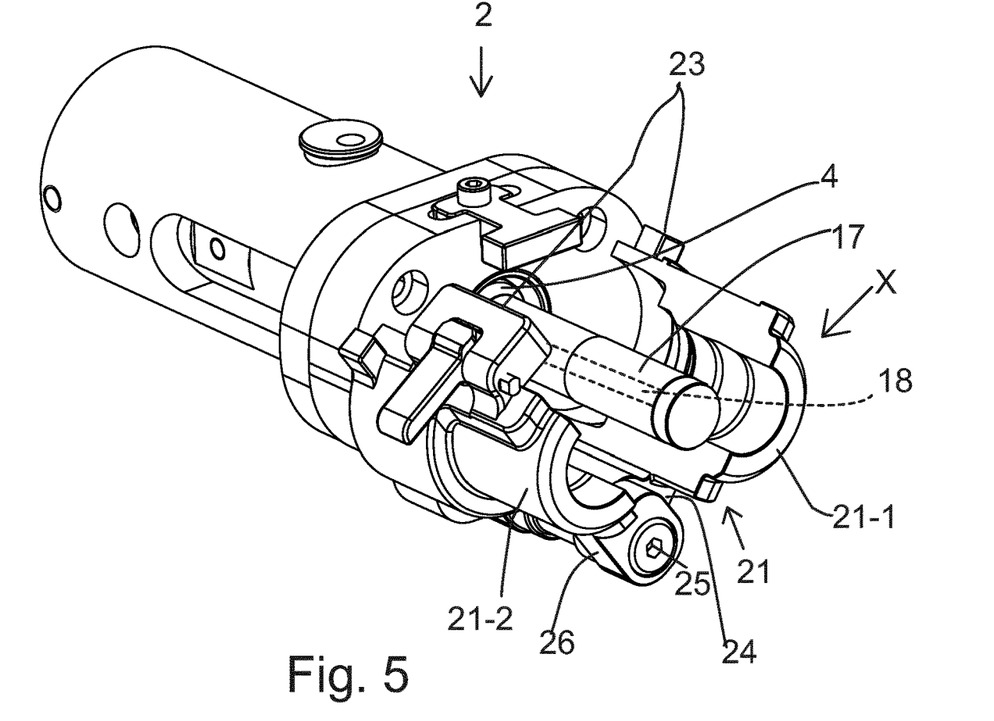
FIG. 5 is an axonometric view of a second embodiment of the expander tool according to the invention, the holding sleeve being in an opened position.
Figure 6:
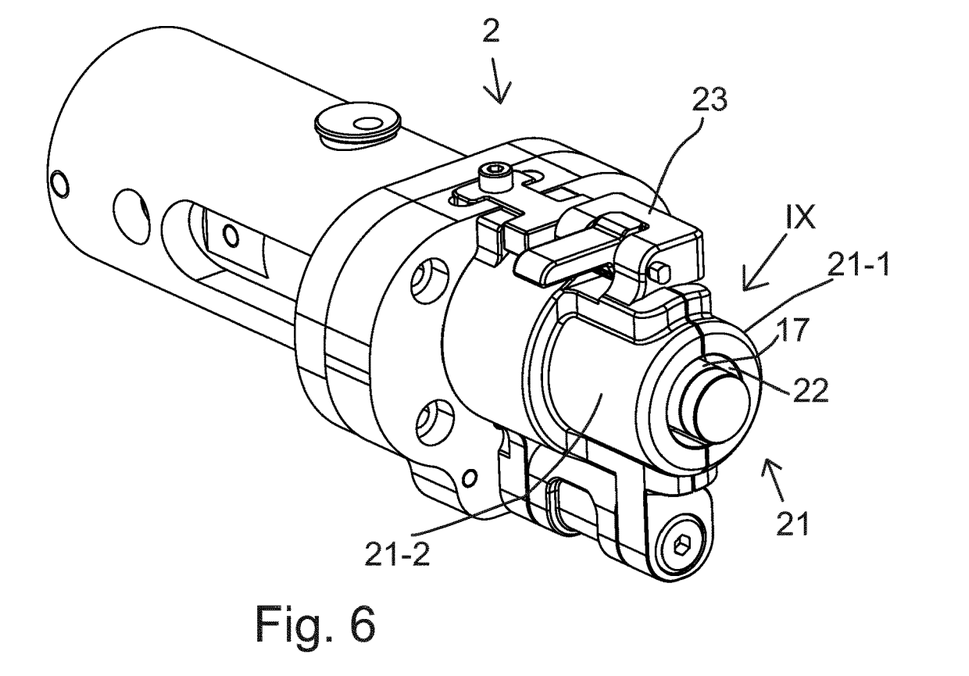
FIG. 6 shows the expander tool of FIG. 5 the holding sleeve being in a closed position.
Figure 7:
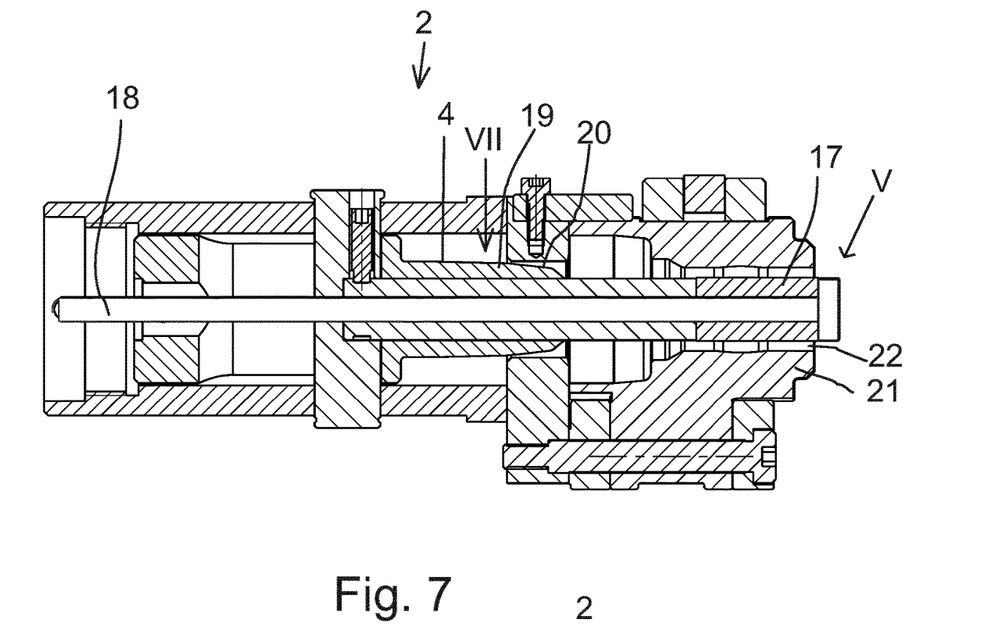
FIG. 7 is a longitudinal cross-section of the expander tool of FIG. 6 without a pipe.

As best seen in FIGS. 5 and 6, the tool head 2 comprises a holding sleeve 21 having an inner channel 22 to receive the pipe for holding the pipe stationary against the pushing force of the mandrel sleeve 19 during expansion of the end of the pipe from outside of the pipe. The holding sleeve 21 comprising mutually openable and closable holding sleeve parts 21-1, 21-2 to enable closing of the holding sleeve 21 to a closed position IX shown in FIG. 6 (and also in FIGS. 7 to 10) around the tube for the expanding operation of the end of the tube, and for opening of the holding sleeve 21 to an opened position X shown in FIG. 5 for releasing the expanded end of the pipe. The holding sleeve 21 comprises a first holding sleeve part 21-1 and a second holding sleeve part 21-2, and a lock device 23 for locking the calibration sleeve parts in a closed position. The first holding sleeve part 21-1 comprises a first pivot arm 24 which is pivoted to be turnable about a pivot hinge axle 25. The second holding sleeve part 21-2 comprises a second pivot arm 26 which is pivoted to be turnable about the same pivot hinge axle 25 as the first pivot arm.

Figure 10:
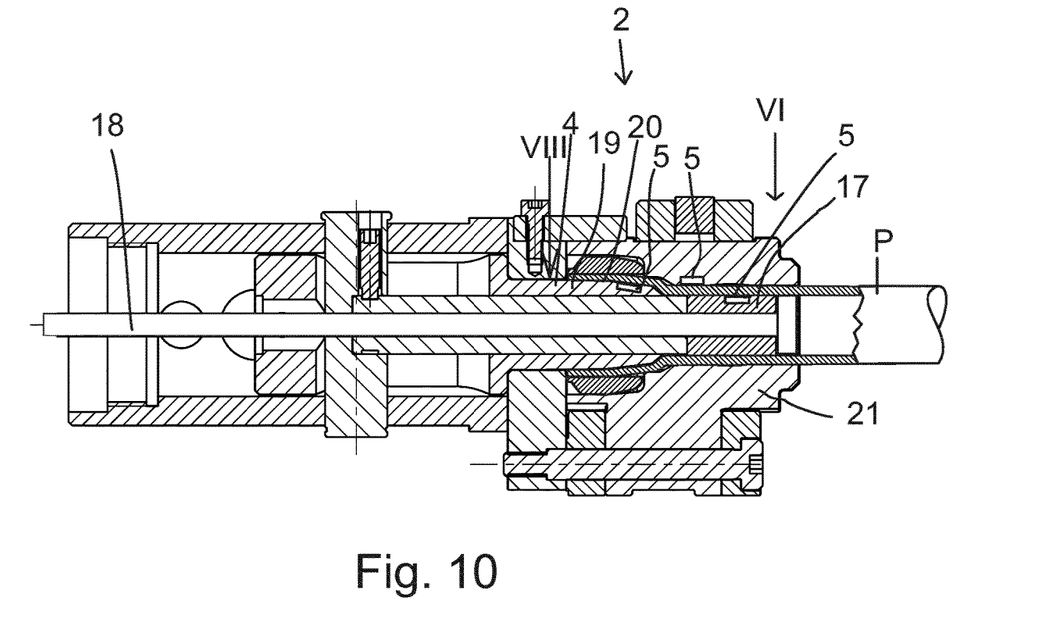
FIG. 10 shows the expander tool of FIG. 7 with the pipe and the compression ring.

FIG. 10 schematically illustrates that the temperature sensor 5 may be arranged to the gripping member 17 and/or to the mandrel sleeve 19 and/or to the holding sleeve 21.

The expander tools shown in FIGS. 1-10 may be operated so that the temperature of the pipe to be expanded is measured with the temperature sensor 5. At least one of expansion control parameters of the tool head 2 is adjusted on the basis the measured temperature of the pipe. The end of the pipe is expanded by the tool head utilizing the adjusted expansion control parameter of the tool head. The expansion control parameter to be adjusted is number of expansion cycles, and/or expansion time, and/or dimension of the expansion diameter. The temperature of the pipe to be expanded is measured directly by contacting the pipe. Alternatively or additionally, the temperature of the pipe to be expanded may be measured indirectly by measuring ambient temperature of a room wherein the pipe has been stored. The temperature of the pipe to be expanded is measured by a temperature sensor 5 integrated in the tool head 2. The diameter of the pipe to be expanded may be recognized and the at least one of the expansion control parameters may be adjusted on the basis of the measured diameter of the pipe. The pipe may be heated by a heater 6 included in the tool head 2. The pipe may be cooled by a cooler 7 included in the tool head 2. The at least one of the expansion control parameters may be adjusted with an input device 8 included in the expander tool 1. The at least one of the expansion control parameters may be automatically adjusted with the electronic control unit 9 included in the expander tool 1.

Although the invention has been the described in conjunction with a certain type of expander tool, it should be understood that the invention is not limited to any certain type of expander tool. While the present inventions have been described in connection with a number of exemplary embodiments, and implementations, the present inventions are not so limited, but rather cover various modifications, and equivalent arrangements, which fall within the purview of prospective claims.

The invention claimed is:

1. An expander tool for expanding an end of a pipe made of plastics having shape memory, the expander tool comprising a tool head which comprises expanding means arranged to be insertable inside the end of the pipe for expanding the end of the pipe, the expander tool comprising:
    a temperature sensor, and
    an electronic control unit for adjusting at least one of the expansion control parameters of the tool head on the basis of the measured temperature value, wherein the temperature sensor is arranged to measure the temperature of the pipe to be expanded directly by making contact to the pipe;
    wherein the tool head comprises a plurality of spreading elements forming the expanding means, the spreading elements being radially movable in relation to a center longitudinal axis (x) of the tool head between a starting position (I), at which the spreading elements are close along the axis (x) and are insertable into the end of the pipe, to an outwardly extended expansion position (II) radially distanced from the axis (x) so as to expand the end of the pipe, each of the spreading elements having an outer spreading surface configured to press against an interior surface of the end of the pipe; and
    wherein the temperature sensor is arranged to the spreading element to measure the temperature by making contact to the pipe.

2. The expander tool according to claim 1, wherein the electronic control unit is configured to adjust the expansion control parameter which is the number of expansion cycles and/or the expansion time and/or the dimension of the expansion diameter.

3. The expander tool according to claim 1, wherein the expander tool comprises a set of interchangeable and detachably attachable tool heads for different pipe diameters, and that each tool head comprises a temperature sensor.

4. The expander tool according to claim 1, wherein the electronic control unit is arranged in the tool head.

5. The expander tool according to claim 1, wherein the expander tool comprises an expander tool frame and the tool head comprises a head frame which is detachably attachable to the expander tool frame.

6. The expander tool according to claim 1, wherein the temperature sensor is arranged in the tool head.

7. The expander tool according to claim 5, wherein the electronic control unit is arranged inside the expander tool frame.

8. The expander tool according to claim 1, wherein the tool head which is configured for expansion of a predetermined pipe diameter comprises an electronic identification means to identify the predetermined pipe dimension, and that the electronic control unit located in the expander tool is arranged to recognize the electronic identification means and adjust the at least one of the expansion parameters on the basis of the identified pipe dimension.

9. The expander tool according to claim 1, wherein the expander tool comprises a heater and/or a cooler for heating and/or cooling the pipe to be expanded.

10. The expander tool according to claim 9, wherein the heater and/or the cooler is arranged in the tool head.

11. The expander tool according to claim 1, wherein the expander tool comprises an input device for manually adjusting the at least one of the expansion control parameters.

12. The expander tool according to claim 1, wherein the expander tool comprises a piston configured to spread the spreading elements from the starting position (I) to the expansion position (II) by moving along the axis (x) from a retracted piston position (III) to a fully extended piston position (IV) against interior surfaces of the spreading elements, and an actuator for moving the piston.

13. The expander tool according to claim 1, wherein the tool head comprises
    a gripping member insertable into the pipe at a distance from the end of the pipe, the gripping member being transformable between a release position (V) allowing its insertion into the pipe and a pressing position (VI) wherein the gripping member exerts a pressing force to the inner surface of pipe to hold the pipe firmly in relation to the tool head,
    a pull rod which is axially movable for transforming the gripping member between the release position (V) and the pressing position (VI),
    a mandrel sleeve having a conical outer surface forming the expansion means, the mandrel sleeve being axially movable between a retracted position (VII) wherein the mandrel sleeve is at position out from the position of the end of the pipe, and an expansion position (VIII) wherein the mandrel sleeve is pushed into the end of the pipe for expanding the end of the pipe.

14. The expander tool according to claim 13, wherein the tool head comprises a holding sleeve having an inner channel to receive the pipe for holding the pipe stationary against the pushing force of the mandrel sleeve during expansion of the end of the pipe from outside of the pipe.

15. The expander tool according to claim 14, wherein the holding sleeve comprising mutually openable and closable holding sleeve parts to enable closing of the holding sleeve to a closed position (IX) around the tube for the expanding operation of the end of the tube, and for opening of the holding sleeve to an opened position (X) for releasing the expanded end of the pipe.

16. The expander tool according to claim 15, wherein the holding sleeve comprises a first holding sleeve part and a second holding sleeve part, and a lock device for locking the holding sleeve parts in a closed position.

17. The expander tool according to claim 16, wherein the first holding sleeve part comprises a first pivot arm which is pivoted to be turnable about a pivot hinge axle, and the second holding sleeve part comprises a second pivot arm which is pivoted to be turnable about the same pivot hinge axle as the first pivot arm.

18. The expander tool according to claim 13, wherein the temperature sensor is arranged to the gripping member and/or to the mandrel sleeve and/or to the holding sleeve.

* * * * *